US008297652B2

(12) United States Patent
Tauchen

(10) Patent No.: US 8,297,652 B2
(45) Date of Patent: Oct. 30, 2012

(54) GAS GENERATING SYSTEM

(75) Inventor: Dale E. Tauchen, Clinton Township, MI (US)

(73) Assignee: TK Holdings, Inc., Armada, MI (US)

( * ) Notice: Subject to any disclaimer, the term of this patent is extended or adjusted under 35 U.S.C. 154(b) by 304 days.

(21) Appl. No.: 12/686,845

(22) Filed: Jan. 13, 2010

(65) Prior Publication Data

US 2010/0176580 A1  Jul. 15, 2010

Related U.S. Application Data

(60) Provisional application No. 61/204,977, filed on Jan. 13, 2009.

(51) Int. Cl.
*B60R 21/26* (2011.01)
(52) U.S. Cl. .................................................. 280/741
(58) Field of Classification Search ............. 280/736, 280/741, 742
See application file for complete search history.

(56) References Cited

U.S. PATENT DOCUMENTS

| | | | | |
|---|---|---|---|---|
| 3,810,655 A | * | 5/1974 | Prachar | 280/736 |
| 5,415,845 A | * | 5/1995 | Brede et al. | 422/305 |
| 5,487,561 A | * | 1/1996 | Mandzy et al. | 280/741 |
| 5,639,117 A | * | 6/1997 | Mandzy et al. | 280/741 |
| 5,669,631 A | * | 9/1997 | Johnson et al. | 280/741 |
| 5,719,351 A | * | 2/1998 | Johnson et al. | 102/440 |
| 5,746,445 A | | 5/1998 | Johnson et al. | 280/741 |
| 5,768,885 A | * | 6/1998 | Johnson et al. | 60/204 |
| 5,803,494 A | * | 9/1998 | Headley | 280/741 |
| 5,829,784 A | * | 11/1998 | Brown et al. | 280/737 |
| 6,039,347 A | | 3/2000 | Maynard | 280/736 |
| 6,076,468 A | * | 6/2000 | DiGiacomo et al. | 102/530 |
| 6,155,600 A | * | 12/2000 | Reynolds et al. | 280/741 |
| 6,481,357 B1 | * | 11/2002 | Lindner et al. | 102/530 |
| 6,789,820 B2 | * | 9/2004 | Meduvsky et al. | 280/742 |
| 6,871,871 B2 | | 3/2005 | Parizat et al. | 280/736 |
| 6,889,613 B2 | * | 5/2005 | Parizat et al. | 102/530 |
| 6,889,614 B2 | | 5/2005 | Parizat et al. | 102/530 |
| 7,464,961 B2 | | 12/2008 | Parizat et al. | 280/741 |
| 7,641,232 B2 | * | 1/2010 | Patterson | 280/736 |

FOREIGN PATENT DOCUMENTS

| | | |
|---|---|---|
| EP | 1 522 469 A1 | 4/2005 |
| EP | 1 522 467 A1 | 9/2006 |
| EP | 1 522 468 B1 | 2/2007 |
| EP | 1 867 531 B1 | 12/2008 |
| EP | 1 908 649 B1 | 7/2009 |

OTHER PUBLICATIONS

Dictionary.com "Tube" and "Tubing" definition May 3, 2012.*

* cited by examiner

*Primary Examiner* — Joseph Rocca
*Assistant Examiner* — Nicole Verley
(74) *Attorney, Agent, or Firm* — L.C. Begin & Associates, PLLC.

(57) ABSTRACT

A gas generating system includes a housing defining an interior, a housing partition dividing the interior into a first portion and a second portion, and at least one opening to enable fluid communication between the second portion and an exterior of the second portion after activation of the gas generating system. The partition is movable within the interior such that a movement of the partition in a first direction causes a flowable material positioned within the second portion to flow through the at least one opening.

16 Claims, 1 Drawing Sheet

GAS GENERATING SYSTEM

CROSS REFERENCE TO RELATED APPLICATIONS

This application claims the benefit of U.S. Application Ser. No. 61/204,977 having a filing date of Jan. 13, 2009.

BACKGROUND OF THE INVENTION

The present invention relates generally to gas generating systems utilizing liquid or otherwise flowable gas generant compositions.

SUMMARY OF THE INVENTION

In one aspect of the embodiments of the present invention, a gas generating system is provided including a housing defining an interior, a housing partition dividing the interior into a first portion and a second portion, and at least one opening to enable fluid communication between the second portion and an exterior of the second portion after activation of the gas generating system. The partition is movable within the interior such that a movement of the partition in a first direction causes a flowable material positioned within the second portion to flow through the at least one opening.

In another aspect of the embodiments of the present invention, a gas generating system is provided including a housing and a partition movable within the housing and dividing an interior of the housing into a first portion and a second portion. A first flowable material is positioned in the second portion, and a second flowable material is positioned in the second portion and separated from the first flowable material. A movement of the partition in a first direction produces a flow of the first and second flowable materials out of the interior second portion after activation of the gas generating system.

In another aspect of the embodiments of the present invention, a gas generating system is provided including a housing and a partition movable within the housing and dividing an interior of the housing into a first portion and a second portion. At least one opening is formed in the housing to enable fluid communication between the second portion and an exterior of the housing after activation of the gas generating system. At least one opening is formed in the partition to enable fluid communication between the second portion and the first portion after activation of the gas generating system.

DETAILED DESCRIPTION

Figure 1:
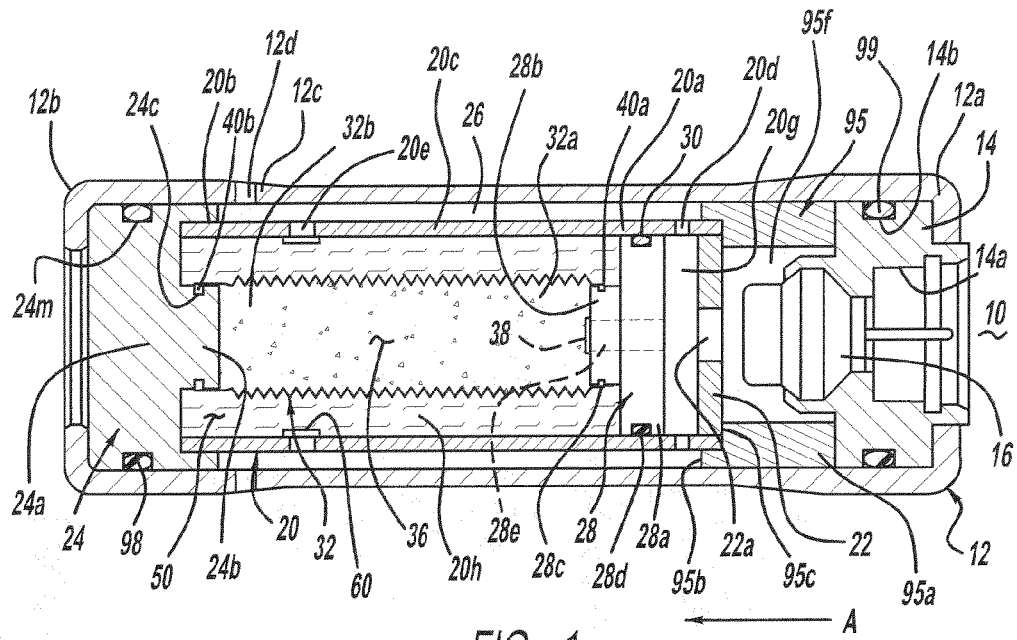
FIG. 1 is a side cross-sectional view of a gas generating system in accordance with one embodiment of the present invention.

FIG. 1 shows a gas generating system 10 in accordance with one embodiment of the present invention.

System 10 includes an outer housing 12 having a first end 12a, a second end 12b, and a wall 12c connecting the first and second ends. At least one opening 12d is formed in wall 12c to enable fluid communication between an interior of housing 12 and the exterior of the housing. In the embodiment shown in FIG. 1, a plurality of openings 12d is formed in the housing wall. In the embodiment shown, housing 12 has a substantially cylindrical cross-sectional shape. However, other cross-sectional shapes are also contemplated. Housing 12 may be formed using any suitable process or processes, from a metal, metal alloy, or any other suitable material or materials.

In the embodiment shown in FIG. 1, a first outer housing end closure 14 is welded, crimped, or otherwise suitably attached to housing first end 12a so as to form a hermetic seal between the housing and the end closure. Alternatively, the housing first end closure may be formed integrally into the structure of the housing. First end closure 14 has an opening 14a formed therein to enable securement of an initiator 16 therein, used for igniting a gas generant material as described in greater detail below. First outer housing end closure 14 also has a groove 14b for receiving an O-ring 99 or other resilient seal therein. Initiator 16 is crimped or otherwise secured in opening 14a so as to form a hermetic seal between the initiator and the end closure. First end closure 14 may be formed using any suitable process or processes, from a metal, metal alloy, or any other suitable material or materials.

Referring to FIG. 1, initiator 16 is positioned and secured within outer housing first end closure opening 14a and/or within inner housing first end closure 14 so as to enable fluid communication between an inner housing first interior portion 20g (described below) and initiator 16 upon activation of the gas generating system. Initiator 16 may be secured using any of several known methods, for example, by welding, crimping, using an interference fit, or by adhesive application. Initiator 16 may be as known in the art. Exemplary initiator constructions are described in U.S. Pat. Nos. 6,009,809 and 5,934,705, incorporated herein by reference.

System 10 also includes an inner housing 20 having a first end 20a, a second end 20b, and a wall 20c connecting the first and second ends. At least one first opening 20d is formed in wall 20c to enable fluid communication between a first interior portion 20g of inner housing 20 and the exterior of the housing. In the embodiment shown in FIG. 1, a plurality of first openings 20d is formed in the housing wall. At least one second opening 20e is also formed in wall 20c spaced apart from opening(s) 20d, to enable fluid communication between a second interior portion 20h of inner housing 20 and the exterior of the housing. In the embodiment shown in FIG. 1, a plurality of second openings 20e is formed in the housing wall. In the embodiment shown, housing 12 has a substantially cylindrical cross-sectional shape. However, other cross-sectional shapes are also contemplated. Inner housing 20 may be formed using any suitable process or processes, from a metal, metal alloy, or any other suitable material or materials.

The material or materials from which inner housing 20 is formed should be specified so as to be chemically compatible with a flowable material 50 in contact with the inner housing. This helps prevent damage to, or degradation of, the housing material(s) resulting from exposure to the flowable material 50. In one embodiment, the flowable material 50 comprises a liquid coolant material (described below). As used herein, the term "flowable material" designates a material that flows under pressure resulting from movement of partition 28 within inner housing 20.

Inner housing second end 20b abuts and/or engages second housing end closure 24 (described below) so as to form a fluid tight seal therebetween to aid in preventing leakage of flowable material 50 from the interior of inner housing 20. For example, inner housing second end 24b may be dimensioned so as to form an interference fit with end closure 24. Alternative methods for providing a suitable seal may also be used.

Examples of suitable materials for inner housing 20 include 316 Stainless steel tubing and carbon steel tubing lined with Polytetrafluoroethylene (PTFE) or Tetrafluoroethylene/Hexafluoropropylene (FEP) copolymer. The copolymer is commercially available under the trade name Chemfluor® FEP Tubing from Saint-Gobain Performance Plastics. The copolymer may be adhered to the steel tubing using fusion bonded epoxy, for example. Other suitable means of adhering the copolymer to the steel tubing may also be used.

A spacer 95 is positioned between first end closure 14 and inner housing 20. A first end 95a of spacer 95 abuts first end closure 14, while a second end 95b of the spacer has a shoulder 95c formed therealong for receiving inner housing first end 20a therein, to help position and secure the inner housing first end within the outer housing. Spacer 95 may be formed using any suitable process or processes, from a metal, metal alloy, or any other suitable material or materials.

In the embodiment shown in FIG. 1, an inner housing first end closure 22 is welded, crimped, or otherwise suitably attached to housing first end 20a so as to form a hermetic seal between the housing and the end closure. Alternatively, the housing first end closure 22 may be formed integrally into the structure of the housing. First end closure 22 has at least one opening 22a formed therein to enable fluid communication between the housing first interior portion 20g and initiator 16 upon activation of the gas generating system. First end closure 22 may be formed using any suitable process or processes, from a metal, metal alloy, or any other suitable material or materials.

It will be appreciated that the size(s) of the opening(s) 22a formed in end closure 22 may be dimensioned so as to provide a throttling effect or to attenuate an initial pressure build up within chamber 95f and first interior portion 20g after activation of initiator 16.

Referring again to FIG. 1, a second housing end closure 24 is welded, crimped, or otherwise suitably attached to housing second end 20b so as to form a hermetic seal between the housing and the end closure. In the embodiment shown in FIG. 1, second end closure 24 serves as an end closure for both the outer housing 12 and the inner housing 20. Alternatively, the second end closure 24 may be formed integrally into the structure of the outer housing. Second end closure 24 has a base portion 24a and a projection 24b extending from a central portion of the base toward inner housing first end closure 22. A groove 24c may be formed along projection 24b for purposes described in greater detail below. In the embodiment shown in FIG. 1, second end closure 24 is secured within inner housing 20 at any desired position so as to enable fluid communication between the interior of inner housing 20 and openings 20d and 20e. That is, all of openings 20d and 20e reside between inner housing first end closure 22 and inner housing second end closure 24. Second end closure 24 also has a groove 24m for receiving an O-ring 98 or other resilient seal therein. Second end closure 24 may be formed using any suitable process or processes, from a metal, metal alloy, or any other suitable material or materials. As seen in FIG. 1, inner housing 20 is positioned and secured within outer housing 12 such that a plenum 26 is formed between outer housing wall 12c and the inner housing.

The material(s) from which the second end closure 24 is formed should be specified such that the second end closure is chemically compatible with a flowable material 36 positioned within inner housing 20 in contact with the second end closure. This helps prevent damage to, or degradation of, the second end closure material(s) resulting from exposure to the flowable material. The flowable material resides within an enclosure formed by a length of tubing 32 (described below).

In one embodiment, the flowable material 36 is a liquid gas generant material (as described below).

The material(s) from which the second end closure 24 is formed should also be specified such that the second end closure is chemically compatible with another flowable material 50 positioned in contact with the second end closure, to help prevent damage to, or degradation of, the second end closure material(s) resulting from exposure to the flowable material. The flowable material 50 is positioned in a cavity formed in the interior of inner housing 20 and surrounding tubing 32 (described below). In one embodiment, flowable material 50 comprises a coolant material (described below).

Second end closure 24 may be formed from, for example, a structural polymer such as Polyether Ether Ketone (PEEK), a chemical resistant metal such as Stellite® 21 cobalt alloy (available from Deloro Stellite Inc.), or a coated metal (such as Nylon 6/6 overmolded onto carbon steel).

Referring again to FIG. 1, a piston or movable partition 28 is movably positioned in inner housing between first end closure 22 and second end closure 24. Piston 28 has a base portion 28a and a projection 28b extending from a central portion of the base toward inner housing second end closure 24. A groove 28c may be formed along projection 28b for purposes described in greater detail below. A seal that is movable with piston 28 is provided to form a hermetic seal between the piston and inner housing wall 20c. In the embodiment shown in FIG. 1, a groove 28d is formed along base portion 28a for receiving an O-ring 30 therein, to provide a resilient seal between the piston and inner housing. At least one opening 28e extends through base portion 28a and projection 28b to enable fluid communication between first interior portion 20g of the inner housing, on a first side of seal 30, and an interior of a length of axially expandable/collapsible tubing 32 secured to (and residing between) piston 28 and inner housing second end closure 24, as described in greater detail below.

It will be appreciated that the size(s) of the opening(s) 28e formed in piston 28 may be dimensioned so as to control a flow rate and/or flow distribution of the gas generant material through the opening(s) 28e first interior portion 20g. Parameters such as the size(s) of the opening(s) 28e and the viscosity or flowability of the flowable material positioned in tube 32 may be adjusted to control the combustion rate of the flowable material (where the flowable material comprises a gas generant material) entering inner housing first portion 20g.

The diameters of tube 32 and inner housing 20 can be dimensioned so as to permit the positioning of greater or lesser amounts of gas generant material 50 within tube 32 and greater or lesser amounts of coolant 50 in the space between inner housing 20 and tube 32, according to design requirements.

The material(s) from which the piston 28 is formed should be specified such that the piston is chemically compatible with a flowable material 50 (described below) positioned in contact with the piston. This helps prevent damage to, or degradation of, the piston material(s) resulting from exposure to the flowable material. In one embodiment, the flowable material 50 comprises a liquid coolant material as described herein.

The material(s) from which the piston is formed should also be specified such that the piston is chemically compatible with a flowable material 36 positioned in contact with the piston, to help prevent damage to, or degradation of the piston material(s) resulting from exposure to the flowable material. In one embodiment, the flowable material 36 comprises a liquid gas generant material (described below).

Piston 28 may be formed from, for example, a structural polymer such as Polyether Ether Ketone (PEEK), a chemical resistant metal such as Stellite® 21 cobalt alloy (available from Deloro Stellite Inc.), or a coated metal (such as Nylon 6/6 overmolded onto carbon steel).

A rupturable, fluid-tight seal 38 (for example, a burst disk or other similar seal) is positioned to opening(s) 28e, for preventing leakage of flowable material 36 (described below) from the interior of tubing 32 through opening(s) 28e. Seal 38 also prevents flame and combustion products from flowing into and along piston opening 28e, thereby preventing ignition of a combustible flowable material 36 residing within tube 32 (described below) while the gas generant material is still in the tube. Thus, seal 38 is designed to be ruptured by pressure caused by a flow of flowable material 36 through opening 28e which impinges on the seal. Various disks, foils, films, etc. may be used to form seal 38. For example, disks made from materials and/or having structures which are relatively more or less readily ruptured may be used. Piston 28 may be formed using any suitable process or processes, from a metal, metal alloy, or any other suitable material or materials.

The material(s) from which the seal is formed should also be specified such that the seal is chemically compatible with a flowable material 36 positioned in contact with the piston, to help prevent damage to, or degradation of the seal material(s) resulting from exposure to the flowable material. In one embodiment, the flowable material 36 comprises a liquid gas generant material (described below).

Seal 38 may be formed from, for example, a polyethylene or polypropylene film ultrasonically welded to nylon on a nylon-overmolded piston. The seal may alternatively be formed by from a rupturable or frangible section or member formed on a polymeric piston or on the nylon overmold, which blocks the opening 28e until ruptured. Any of a variety of alternative methods may be used to rupture seal 38. For example, rather than the seal being ruptured by an overpressure condition caused by movement of the partition, a projectile may be directed into the seal to rupture it. Other methods of rupturing the seal are also contemplated.

A length of axially expandable/collapsible tubing 32 has a first end 32a secured to piston projection 28b and a second end 32b secured to inner housing second end closure projection 24b. First and second ends 32a and 32b are secured to piston projection 28b and end closure projection 24b so as to form fluid-tight seals between the tubing ends and piston 28 and end closure 24. Tubing 32 may be formed from a polymer material or any other suitable material, and may have a corrugated structure or any other structure suitable for enabling axial expandability and/or collapsibility of the tube.

The material(s) from which the tubing is formed should be specified such that the tubing is chemically compatible with a flowable material 50 (described below) positioned exterior of the tubing, in the cavity formed between the tubing and the inner housing 20. This helps prevent damage to, or degradation of, the tubing material(s) resulting from exposure to the flowable material. In one embodiment, the flowable material 50 comprises a liquid coolant material (described below)

The material(s) from which the tubing is formed should also be specified such that the tubing is chemically compatible with a flowable material 36 (described below) positioned within the length of tubing, to help prevent damage to, or degradation of, the tubing material(s) resulting from exposure to the flowable material 36. When positioned and secured in inner housing 20 as described herein, tubing 32 forms an enclosure for containing a flowable material therein. In one embodiment, the flowable material 36 comprises a liquid gas generant material as described herein.

The material(s) from which the tubing is formed and the structure of the tubing should also be specified such that the tubing can withstand pressures exerted by the flowable materials both inside and exterior of the tubing during operation of the gas generating system without rupturing.

Tubing 32 may comprise, for example, polyethylene blow-molded corrugated tubing or polypropylene blow-molded corrugated tubing.

Referring to FIG. 1, in one particular embodiment, tubing ends 32a and 32b are secured to piston projection 28b and second end closure projection 24b using tie straps 40a and 40b wrapped over the end portions of the tube 32 and secured so as to reside within grooves 24c and 28c. Alignment of the tie straps with the grooves 24c and 28c and tightening of the tie straps such that the straps reside within the grooves aids in preventing movement of the tie straps along the projections 24b and 28b and detachment of the tube end portions from the projections. Other methods may also be used to secure the tubing ends 32a and 32b to piston projection 28b and second end closure projection 24b, depending on the needs of a particular application, on the materials from which the tubing, piston, and second end closure are formed, and other factors. However, any fasteners, adhesives, or other securement means in contact with the coolant material 50 (described below) residing within the interior of inner housing 20 should be chemically compatible with the flowable material 50, so that securement of the tubing ends to the piston projection 28b and second end closure projection 24b is not degraded by long-term exposure of the securement means to the flowable material. Similarly, any fasteners, adhesives, or other securement means in contact with the flowable material 36 residing within the interior of tubing 32 should be chemically compatible with the gas generant material so that securement of the tubing ends to the piston projection 28b and second end closure projection 24b is not degraded by long-term exposure of the securement means to the flowable material 36. The securement method should also ensure retention of the fluid-tight seals formed between the tubing and piston projection 28b and second end closure projection 24b when subjected to the forces produced by operation of the gas generating system.

Materials suitable for securement of tubing 32 include, for example, Nylon 6/6 tie straps, 316 stainless steel clamp rings available from Oetiker International, and 316 stainless steel hose clamps.

In one embodiment, flowable material 36 positioned inside tubing 32 comprises a liquid gas generant material. In one embodiment, the gas generant material comprises a hydroxyl ammonium nitrate-based liquid monopropellant. However, alternative compositions are also contemplated, depending on the needs of a particular application. In a particular embodiment, a viscosity modifier is added to the flowable material 36 positioned in tube 32. The viscosity modifier may be added to the flowable material in any amount required to achieve a desired viscosity or flowability of the flowable material for a particular application or according to design requirements. By varying the amount of modifier added to the flowable material, any of a wide range of viscosities may be achieved. One example of a suitable viscosity modifier is Cabosil, a synthetic, amorphous, untreated fumed silicon dioxide available from Eager Plastics, Inc. of Chicago, Ill.

Referring again to FIG. 1, a flowable material 50 is positioned in an interior portion 20h of inner housing 20 bounded by piston 28, tubing 32, and inner housing second end closure 24. Flowable material 50 may be selected for its chemical compatibility with the materials from which the piston 28, tubing 32, and inner housing second end closure 24 are formed. In one embodiment, flowable material 50 is a water-based liquid coolant with a freeze-point modifier added (for example, a composition similar to an aircraft runway de-icer). Any of a variety of alternative compositions may be used, depending on chemical compatibility of the coolant with other components of the gas generating system and other needs of a particular application. In a particular embodiment, a viscosity modifier is added to the flowable material 50 positioned in inner housing 20. The viscosity modifier may be added to the flowable material in any amount required to achieve a desired viscosity or flowability of the flowable material for a particular application or according to design requirements. By varying the amount of modifier added to the flowable material, any of a wide range of viscosities may be achieved. One example of a suitable viscosity modifier is Cabosil, a synthetic, amorphous, untreated fumed silicon dioxide available from Eager Plastics, Inc. of Chicago, IL.

It will be appreciated that features such as the viscosity of the flowable material 36 in tube 32, the viscosity of the flowable material 50 exterior of the tube 32, the size(s) of opening(s) 28e, and other pertinent variables may be modified so as to control the pressure differential between the interior of tube 32 and the exterior of the tube. This aids in maintaining the collapsibility and structural integrity of tube 32 during operation of the gas generating system.

A rupturable, fluid-tight seal 60 (for example, a burst disk or other similar seal) is positioned to cover inner housing second opening(s) 20e, to prevent leakage of the coolant 50 from the inner housing prior to activation of the gas generating system. Various disks, foils, films, etc. may be used to form seal 60. For example, disks made from materials and/or having structures which are relatively more or less readily ruptured may be used. However, the material(s) from which the seal is formed should also be specified such that the piston is chemically compatible with flowable material 50 positioned in contact with the piston, to help prevent damage to, or degradation of, the seal material(s) resulting from exposure to the flowable material. In one embodiment, the flowable material 50 comprises a liquid coolant material as described herein.

Seal 60 may be formed from, for example, an adhesive backed stainless steel foil (in an embodiment where the inner housing 20 is also formed from stainless steel), or a polyethylene or polypropylene film ultrasonically welded to the inner housing coating (if any).

It will be appreciated that one or more of the diameters of tube 32 and inner housing 20 can be dimensioned so as to permit the positioning of greater or lesser amounts of flowable material 36 within tube 32 and greater or lesser amounts of flowable material 50 in the space between inner housing 20 and tube 32, according to design requirements.

Operation of the as generating system will now be discussed for an embodiment in which flowable material 36 is a liquid gas generant material and flowable material 50 is a liquid coolant material.

Referring to FIG. 1, upon receipt of a signal from a crash sensor, an electrical activation signal is sent to igniter 16 to activate the igniter. Combustion products (such as flame, heat, and a pressure wave) resulting from activation of the igniter expand into housing first interior portion 20g, causing piston 28 to move in the direction indicated by arrow "A". Movement of the piston in direction "A" increases pressure on the liquid gas generant material 36 residing within tube 32, causing seal 38 to rupture and liquid gas generant residing in tubing 32 to flow through piston opening(s) 28e into housing first interior portion 20g, where it is ignited by the combustion products. The resulting increase in pressure in housing first interior portion 20g produces further motion of piston in direction "A", causing additional liquid gas generant to flow from the tubing interior through opening 28e and into the housing first interior portion 20g, where it is ignited. Gases and other by-products resulting from combustion of the liquid gas generant flow from housing first interior portion 20g through opening(s) 20d to an exterior of the inner housing. Due to the use of a liquid gas generant material, there are virtually no particulates produced by the combustion process, thereby obviating the need for a particulate filter. This process continues until at least most of the liquid gas generant present in the tubing interior prior to activation of the system has been forced out of the tubing.

Simultaneously, as piston 28 moves in the direction of arrow "A", the pressure on liquid coolant 50 residing in housing second interior portion 20h, between tubing 32 and inner housing 20 is increased until seal(s) 60 finally ruptures, permitting the coolant to flow out of opening(s) 20e in inner housing 20. This coolant mixes in plenum 26 with the generated gases flowing out of opening(s) 20d to cool the gases. Thus, heat is transferred from the generated combustion gases to the coolant, vaporizing the coolant and cooling the gases. The cooled gases flow out of openings 12d formed in outer housing 12, then into a gas-actuatable device (for example, and airbag) operatively coupled to the gas generating system.

Figure 2:
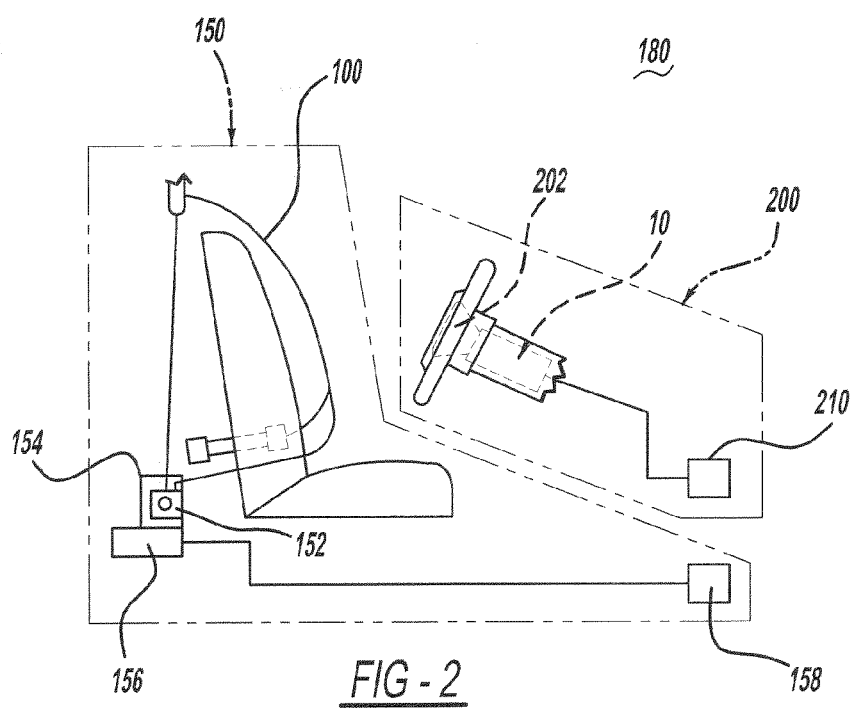
FIG. 2 is a schematic view of an airbag system and a vehicle occupant protection system incorporating a gas generating system in accordance with an embodiment of the present invention.

Referring now to FIG. 2, a gas generating system in accordance with an embodiment described herein may be incorporated into an airbag system 200. Airbag system 200 includes at least one airbag 202 and a gas generating system 10 in accordance with an embodiment of the present invention, coupled to airbag 202 no as to enable fluid communication with an interior of the airbag. Airbag system 200 may also include (or be in communication with) a crash event sensor 210. Crash event sensor 210 may include a known crash sensor algorithm (not shown) that signals actuation of airbag system 200 via, for example, activation of gas generating system 10 in the event of a collision.

Referring again to FIG. 2, airbag system 200 may also be incorporated into a broader, more comprehensive vehicle occupant protection system 180 including additional elements such as a safety belt assembly 150. FIG. 2 shows a schematic diagram of one exemplary embodiment of such a protection system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit gas generating systems contemplated in accordance with the present invention.

It will be understood that the foregoing descriptions of embodiments of the present invention are for illustrative purposes only. As such, the various structural and operational features disclosed herein are susceptible to a number of modifications commensurate with the abilities of one of ordinary skill in the art, none of which departs from the scope of the present invention as defined in the appended claims.

What is claimed is:

1. A gas generating system comprising:
   a housing defining an interior;
   a movable housing partition dividing the interior into a first portion and a second portion;
   a flowable gas generant material positioned in the second portion;
   at least one opening to enable fluid communication between the second portion and an exterior of the second portion after activation of the gas generating system; and
   a length of collapsible tubing positioned within the interior second portion and defining an enclosure structured for containing a flowable material therein,
   the enclosure being positioned to enable fluid communication with the at least one opening after activation of the gas generating system.

2. The gas generating system of claim 1 further comprising a flowable coolant material positioned in the second portion.

3. The gas generating system of claim 1 wherein a cavity is formed within the second portion and exterior of the enclosure for containing another flowable material therein.

4. The gas generating system of claim 1 further comprising an initiator positioned so as to enable fluid communication with the partition after activation of the gas generating system, and wherein products resulting from activation of the initiator produce motion of the partition in the first direction.

5. The gas generating system of claim 1 further comprising at least one opening formed in the partition to enable fluid communication between the first portion and the second portion after activation of the gas generating system, and wherein the system is structured such that movement of the partition in the a first direction causes flowable material positioned within the second portion to flow through the at least one opening from the second portion into the first portion.

6. A vehicle occupant protection system comprising a gas generating system in accordance with claim 1.

7. A gas generating system comprising:
   a housing defining an interior;
   a movable housing partition dividing the interior into a first portion and a second portion;
   at least one opening to enable fluid communication between the second portion and an exterior of the second portion after activation of the gas generating system; and
   a length of collapsible tubing positioned within the interior second portion and defining an enclosure structured for containing a flowable material therein,
   the enclosure being positioned to enable fluid communication with the at least one opening after activation of the gas generating system,
   wherein the length of tubing has a first end secured to the partition so as to form a fluid-tight seal between the first end and the partition.

8. The gas generating system of claim 7 further comprising a housing end closure secured to the housing, and wherein the length of tubing has a second end secured to the end closure so as to form a fluid-tight seal between the second end and the end closure.

9. The gas generating system of claim 7 wherein the housing has at least one first opening formed therealong to enable fluid communication between the interior first portion and an exterior of the housing after activation of the gas generating system, and wherein products resulting from combustion of the gas generant material flow through the at least one first opening to the exterior of the housing.

10. The gas generating system of claim 9 wherein the housing has at least one second opening formed therealong to enable fluid communication between the interior second portion and the exterior of the housing after activation of the gas generating system.

11. The gas generating system of claim 10 further comprising another flowable material positioned in the interior second portion, and wherein the motion of the partition in the first direction produces a flow of the second flowable material through the at least one second opening to the exterior of the housing to mix with the products of combustion of the gas generant material.

12. A gas generating system comprising:
   a housing;
   a partition movable within the housing and dividing an interior of the housing into a first portion and a second portion;
   an initiator positioned exterior of the housing; and
   a housing end closure secured to the housing between the initiator and the partition to form a chamber between the initiator and the partition, the end closure including an opening to enable fluid communication between the initiator and the partition,
   wherein the partition is structured to be movable within the interior such that a movement of a partition in a first direction causes a flowable material positioned within the second portion to flow through the opening and into the chamber.

13. The gas generating system of claim 12 further comprising an opening in the housing to enable fluid communication between the first portion and the exterior of the housing after activation of the gas generating system.

14. A vehicle occupant protection system comprising a gas generating system in accordance with claim 12.

15. A vehicle occupant protection system comprising a gas generating system in accordance with claim 12.

16. A gas generating system comprising:
   a housing defining an interior;
   a movable housing partition dividing the interior into a first portion and a second portion, the movable housing partition containing at least one opening formed in the partition to enable fluid communication between the second portion and the housing first portion after activation of the gas generating system;
   at least one opening formed in the movable housing partition to enable fluid communication between the second portion and an exterior of the second portion after activation of the gas generating system; and
   a length of collapsible tubing positioned within the interior second portion and defining an enclosure structured for containing a flowable material therein,
   the enclosure being positioned to enable fluid communication with the at least one opening after activation of the gas generating system and the partition structured to be movable within the interior such that a movement of the partition in a first direction causes a flowable material positioned within the tubing enclosure to flow through the at least one opening.

* * * * *